(12) United States Patent
Rosen

(10) Patent No.: US 10,067,697 B2
(45) Date of Patent: *Sep. 4, 2018

(54) ARCHIVING IMAGERY AND DOCUMENTS ON DIGITAL OPTICAL TAPE

(71) Applicant: Group 47, Inc., Woodland Hills, CA (US)

(72) Inventor: Daniel Scott Rosen, Thousand Oaks, CA (US)

(73) Assignee: Group 47, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,632

(22) Filed: Sep. 20, 2016

(65) Prior Publication Data

US 2017/0010828 A1    Jan. 12, 2017

Related U.S. Application Data

(63) Continuation-in-part of application No. 14/249,922, filed on Apr. 10, 2014, now Pat. No. 9,508,376.
(Continued)

(51) Int. Cl.
*G06K 9/34*        (2006.01)
*G06F 3/06*        (2006.01)
(Continued)

(52) U.S. Cl.
CPC .......... *G06F 3/0619* (2013.01); *G06F 3/0638* (2013.01); *G06F 3/0682* (2013.01);
(Continued)

(58) Field of Classification Search
CPC ..... B41J 2/465; G03G 15/0863; G11B 7/258; G11B 7/013; G06T 2207/20112; G06T 7/0081; G06T 7/408; G06T 9/007; G06T 9/008; G06T 9/00; G06T 1/0021; G06T 2201/0052; H04N 1/1056; H04N 2201/02493; H04N 19/167; H04N 5/23245; H04N 19/122; H04N 19/129; H04N 1/3873; H04N 1/32101; H04N 19/124; H04N 19/34; H04N 19/36; H04N 2201/0404; H04N 1/58; H04N 9/3179; H04N 19/46; H04N 19/63; H04N 1/0464; H04N 1/0467; H04N 1/1013; H04N 1/32154; H04N 1/3217; G11C 15/00; G11C 13/042; G09G 3/2033; G09G 2360/123; G09G 3/2022; G09G 5/399;
(Continued)

(56) References Cited

U.S. PATENT DOCUMENTS 4,661,941 A * 4/1987 Bell ............... G11B 7/0031
                                                347/248
4,926,177 A * 5/1990 Sakata ............... G02F 7/00
                                                341/137
(Continued)

*Primary Examiner* — Aklilu Woldemariam
(74) *Attorney, Agent, or Firm* — SoCal IP Law Group LLP; Angelo Gaz; Steven C. Sereboff

(57) ABSTRACT

Methods and apparatus for archival storage of an image are disclosed. The image is converted into one or more bit plane images. Fiducial markers are generated and written onto digital optical tape concurrent with writing the one or more bit plane images onto the digital optical tape.

11 Claims, 7 Drawing Sheets

Related U.S. Application Data

(60) Provisional application No. 61/811,025, filed on Apr. 11, 2013.

(51) Int. Cl.
 *G11B 7/003* (2006.01)
 *G11B 7/013* (2006.01)

(52) U.S. Cl.
 CPC .............. *G06K 9/34* (2013.01); *G11B 7/003* (2013.01); *G11B 7/013* (2013.01)

(58) Field of Classification Search
 CPC .. G09G 2340/0407; G09G 5/395; G02F 3/00; G02F 7/00; G06K 9/6253; G06K 9/00577; G06K 9/74; G06F 3/04842; G06F 15/0283; G06F 3/0483; G06F 3/147; H04W 88/02; F02B 2075/027
 USPC ......... 382/164; 369/100, 112, 122; 358/474, 358/487; 347/239, 255
 See application file for complete search history.

(56) References Cited

U.S. PATENT DOCUMENTS

| | | | |
|---|---|---|---|
| 5,091,967 A * | 2/1992 | Ohsawa | G06T 7/194 348/26 |
| 5,264,948 A * | 11/1993 | Imoto | H04N 1/0464 355/55 |
| 5,321,683 A | 6/1994 | Olczak | |
| 5,412,592 A * | 5/1995 | Krishnamoorthy | G06K 9/74 365/49.17 |
| 6,605,330 B2 | 8/2003 | Tyan et al. | |
| 6,741,503 B1 * | 5/2004 | Farris | G09G 3/346 365/189.05 |
| 7,154,629 B2 * | 12/2006 | Gubo | G06F 17/30011 358/1.17 |
| 7,248,278 B1 | 7/2007 | Carlisle et al. | |
| 8,069,320 B1 * | 11/2011 | Per | G06F 11/1451 707/641 |
| 8,594,137 B2 * | 11/2013 | Hobbs | H04N 19/44 370/521 |
| 2002/0049718 A1 * | 4/2002 | Kleiman | G06F 11/1435 |
| 2002/0154129 A1 | 10/2002 | Goyins et al. | |
| 2004/0156548 A1 * | 8/2004 | Kodama | G06T 1/0021 382/232 |
| 2004/0161156 A1 * | 8/2004 | Matsubara | H04N 19/157 382/232 |
| 2006/0012815 A1 * | 1/2006 | Ebner | H04N 1/00127 358/1.13 |
| 2007/0065018 A1 * | 3/2007 | Thiagarajan | H04N 19/50 382/232 |
| 2007/0214137 A1 * | 9/2007 | Gloor | G06F 17/30716 |
| 2008/0231568 A1 | 9/2008 | Chen et al. | |
| 2009/0046301 A1 * | 2/2009 | Asakura | G01B 11/24 356/610 |
| 2013/0235231 A1 * | 9/2013 | Liu | G06T 9/00 348/223.1 |

\* cited by examiner

ARCHIVING IMAGERY AND DOCUMENTS ON DIGITAL OPTICAL TAPE

RELATED APPLICATION INFORMATION

This patent is a continuation-in-part of application Ser. No. 14/249,922, filed Apr. 10, 2014, titled ARCHIVING IMAGERY ON DIGITAL OPTICAL TAPE, now U.S. Pat. No. 9,508,376, which claims priority from provisional patent application No. 61/811,025, filed Apr. 11, 2013, titled ARCHIVING IMAGERY ON DOTS, which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to archival data storage.

Description of the Related Art

Color photographic recording film is unsuitable for long-term archival storages of motion pictures and other imagery. Color film contains photographically active chemicals which remain in the film after development. These chemicals will continue to undergo chemical reactions which cumulatively cause color fading in the images. To avoid color fading, color motion picture imagery is commonly archived onto black and white film by dividing the color image into constituent red, green, and blue color channels. Each of these color channels is recorded onto a separate roll of black and white film. Each roll of film corresponding to a single color is known as a "record" with the totality of film rolls being known as a "separation master". The developed black and white film is relatively stable (compared to color film) but still subject to degradation over long storage periods.

Conventional magnetic recording media are typically produced using a continuous wet coating process, where a magnetic dispersion is applied to the base film. This magnetic dispersion consists of binders, magnetic pigments, dispersants and lubricants which are dissolved in organic solvents to form a slurry. These binders (along with residual solvent, dispersants, etc.) will, over time, undergo chemical processes which may weaken their ability to hold the magnetic pigments to the base media or may cause breakdown of the pigments themselves due to chemical reactions. Thus magnetic storage media may also be unsuitable for archival storage of images and other data.

Digital optical tape system (DOTS) media based on a very stable, very sensitive phase-change recording material has a potential for archival storage of imagery, data, and documents for periods in excess of 100 years. It has been shown that DOTS media is stable for 100 years at 38° C. and over 200 years at room temperature (25° C.). Further, DOTS media is immune to chemical, water, and other environmental damage and is impervious to corrosion.

As described in U.S. Pat. No. 6,505,330, DOTS media may be formed by coating an alloy of Antimony, Tin, and, optionally, one or more additional metals onto a polymer film. The recording material may be coated on the film using a physical vapor deposition (PVD) process such as, for example, DC magnetron sputtering. The film may be a dimensionally stable polymer material such as, for example, polyethylene terephthalate (PET), commercially known as Mylar® or Estar®. The recording material experiences a phase change when heated to a temperature about 180° Centigrade. The phase change is accompanied by a change in optical reflectivity. The DOTs media has two states (i.e. any spot on the media either has or has not been heated to cause the phase change). Thus all information to be recorded on the DOTS media must be converted into binary data.

Data may be written onto the DOTS media by localized heating using a laser or other energy source. For example, U.S. Pat. No. 7,248,278 describes a printing system that may be suitable for writing data onto the DOTS media. A linear spatial light modulator is illuminated by an expanded laser beam, and an image of the spatial light modulator is projected onto a photosensitive surface, which could be the DOTS media.

Recorded data may be read from the DOTS media by detecting the localized optical reflectivity of the media. For example, U.S. Pat. No. 5,321,683 describes a system for reading the DOTS media. A line of data on the DOTS media is illuminated by a linearly expanded laser beam, and an image of the DOTS media is projected onto a detector array.

In this patent, a "color image" is an image with more than one color or hue, as opposed to a "black and white" image that is comprised of black, white, and intermediate shades of gray. A "film image" is an image recorded on photographic film, as opposed to and image captured or created digitally. A "film image" may be a positive or negative transparency or a print. A "digital image" is not literally an image that can be seen, but rather a set of digital data that represents an image and can be reconstructed into a visible image by, for example, by printing the data or presenting the data on a display.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Processes

Figure 1:
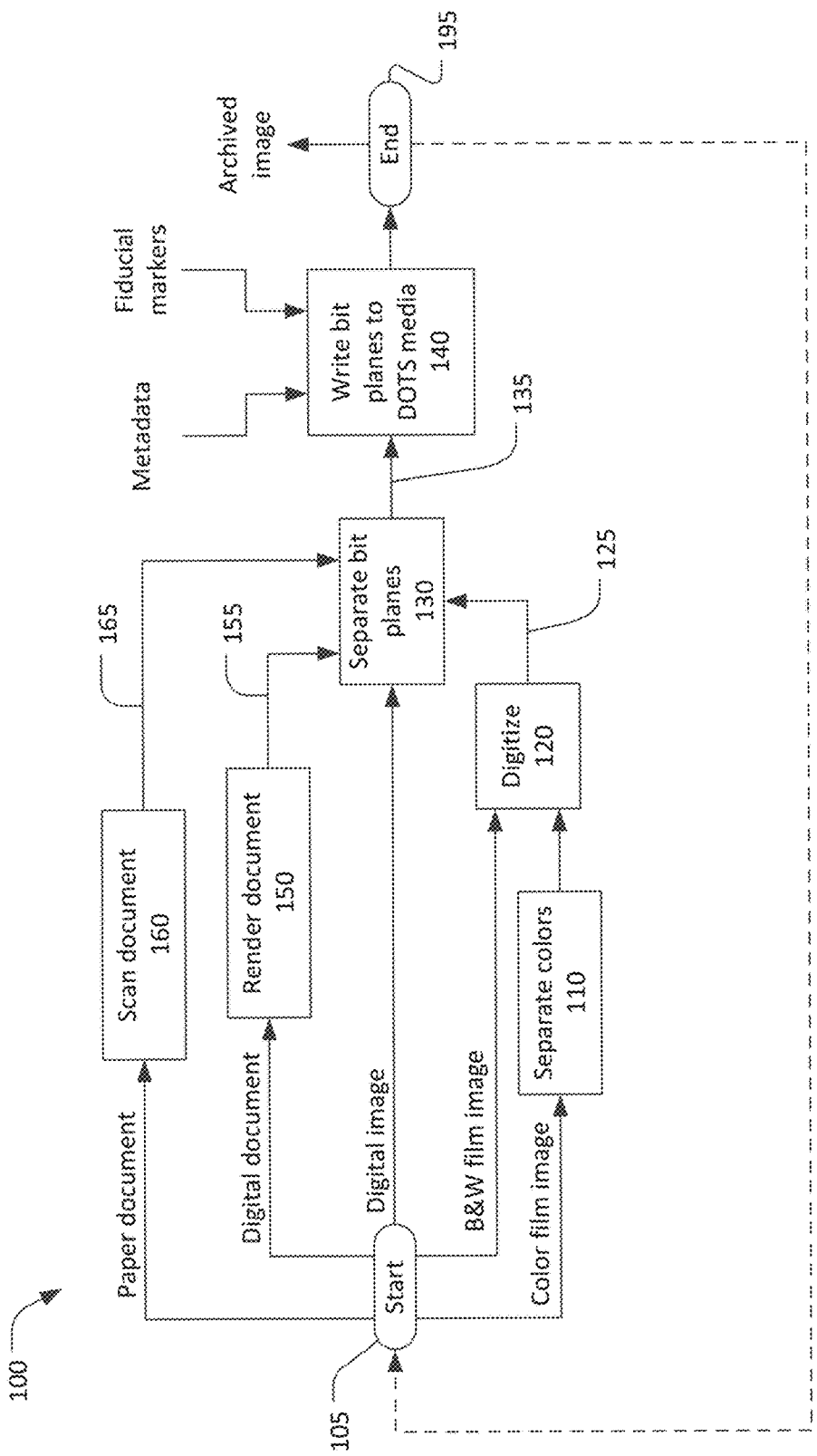
FIG. 1 is a flow chart of a process for archiving imagery on DOTS media.

Referring now to FIG. 1, a process 100 for archiving an image on digital optical tape may start at 105 and end at 195.

The process 100 starts at 105 with an image, which may be a photograph, a frame of a motion picture or video recording, an image of a document. The image at 105 may be a color film image, a black and white film image, a paper document, or a digital image or document. The process 100 ends at 195 when digital information representing the image has been recorded on the DOTS media. While the process 100 is not cyclic in nature, the process 100 may be repeated for each image frame of a motion picture or video recording. When the process 100 is used to archive a motion picture or video recording, the process 100 may be performed as a pipeline, where various actions of the process 100 are performed on different image frames at the same time. The process 100 may include separating the image into primary colors at 110, digitizing the image at 120, dividing the digitized image into bit planes at 130, and writing the bit planes onto the digital optical tape system (DOTS) media at 140.

A film image may be digitized, or converted into a digital image, by measuring the optical transmittance or reflectivity of the image at finite sample points, commonly called picture elements or "pixels". The optical transmittance or reflection may be measured at each pixel, and the measurements may be digitized or converted into binary numbers. Typically, each pixel may be digitized as three binary numbers, each having eight to twelve bits, representing the red, green, and blue components of the transmission or reflection of the pixel. For example, a frame of a color motion picture recorded on film may be divided spatially into an array of 3000×4000 pixels. The film image may be converted into 3000×4000×12 bits of binary data which represents the image and can be printed or displayed to reconstruct the image.

Digitizing a film image at 120 may be performed as a single operation that digitizes all of the color components of the image simultaneously. For example, a still photograph may be converted to a digital image using a common flat-bed scanner. However, equipment that digitizes color images in a single operation may compromise the digital image quality, such as resolution and/or dynamic range. Higher digital image quality (i.e. digital data that allows a more faithful reconstruction of the original image) may be obtained by first separating the color film image into color components at 110 and then individually digitizing each color component at 120.

Figure 2:
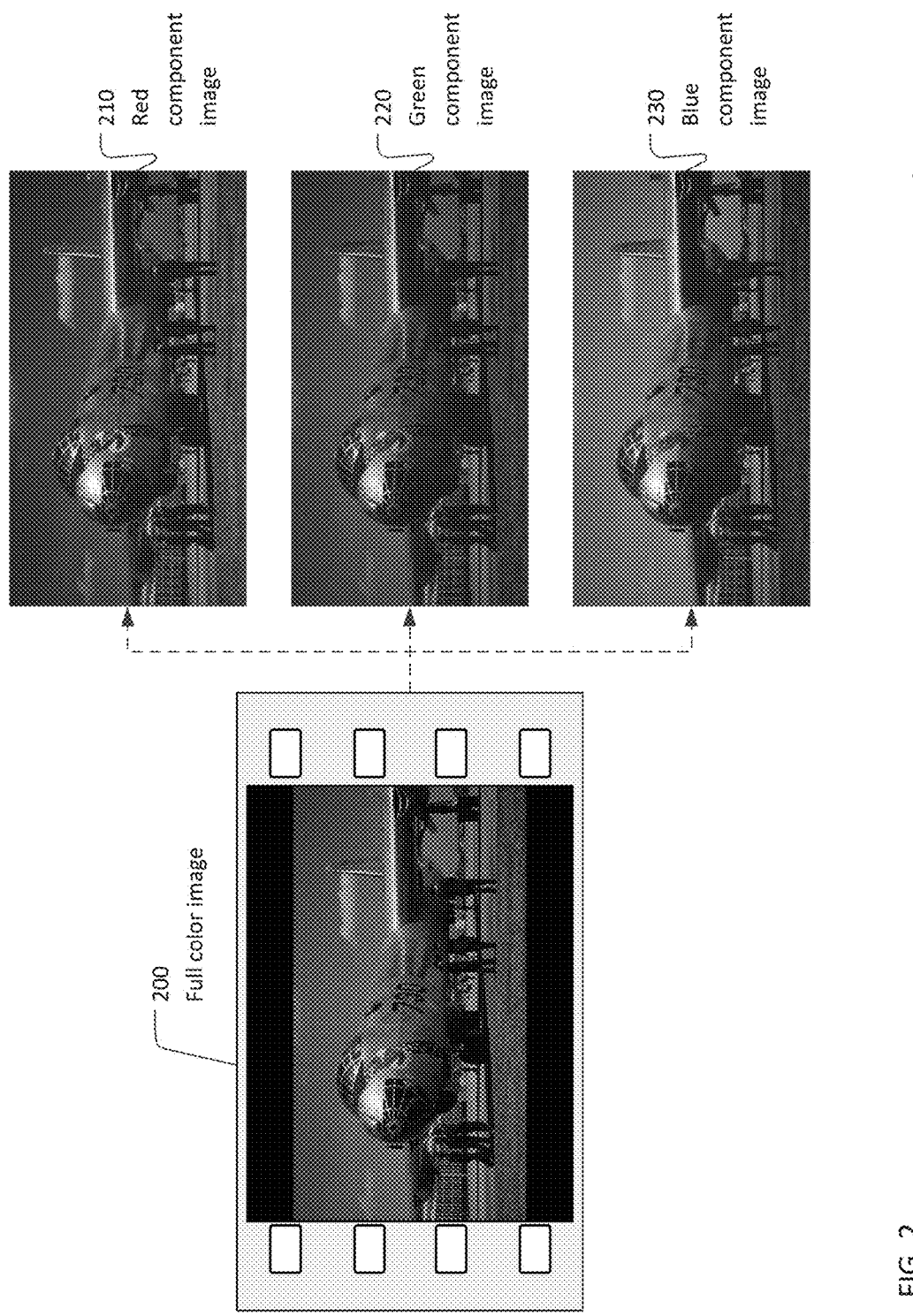
FIG. 2 is an exemplary image and a graphical representation of color separation.

As shown in FIG. 2, separating the separate primary colors of the film image at 110 may result in a color film image 200 being divided into separate red, green, and blue image components, 210, 220, 230 respectively. Separating the primary colors of the color film image 200 may be performed optically by printing the image, or a negative of the image, onto black and white film using an appropriately colored light source (or a white light source with an appropriately colored filter). For example, the color film image 200 may be illuminated with red light to print the red image component 210 on black and white recording film. Similarly, the color film image 200 may be illuminated with green light to print the green image component 220 on black and white recording film and illuminated with blue light to print the blue image component 230 on black and white recording film.

The individual black and white images representing the color components may then be digitized at 120 by scanning each image past a linear or two-dimensional photodetector array, by scanning each image using a flying spot scanner, or by some other technique. Digitizing the image at 120 is not required for images captured with a digital camera, and separating colors at 110 may not be required if a separation master, as previously described, is available. The output from 120 may be three "color component digital images" 125 which respectively represent the red, green, and blue color components of the original color image.

Separating the image into primary colors at 110 is not required for a black and white film image. A black and white film image may be digitized at 120 to provide a single-color component digital image 125. Separating the image into primary colors at 110 and digitizing the image at 120 are not required for a digital image that was initially captured using a digital camera or created utilizing digital imagery processes or software.

Digital documents, such as text documents or spreadsheets, may be rendered at 150 into one or more color component digital images 155 using software comparable to the software now used to render digital documents into bitmap format for printing. Paper documents may be scanned at 160 to provide one or color component digital images 165.

Figure 3:
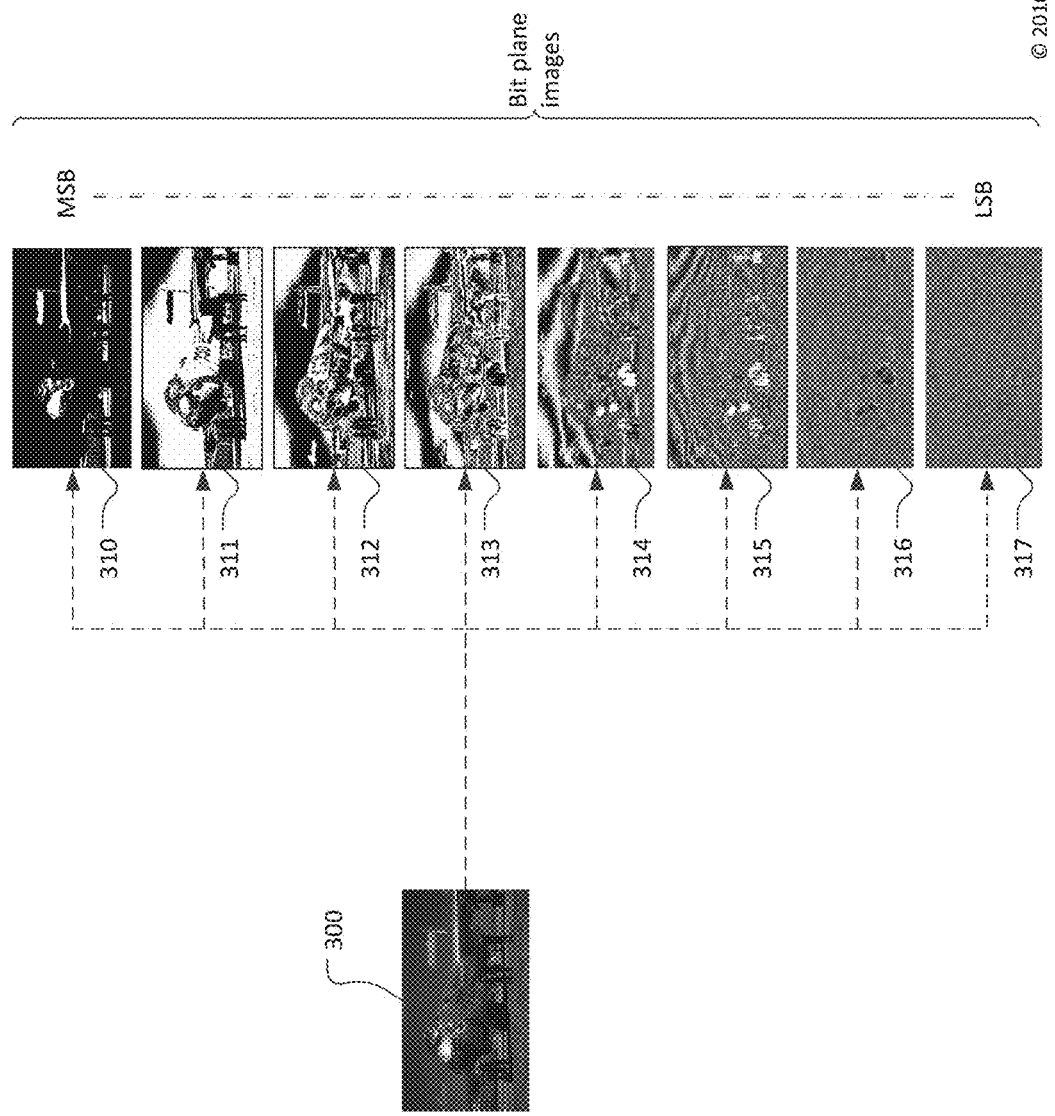
FIG. 3 is a graphical representation of bit plane separation.

Referring back to FIG. 1, each digital image or color component digital image 125, 155, 165 may then be separated into one or more bit plane images at 130. For example, as shown in FIG. 3, a color component digital image 300 may represent, for example, the red component of a color image. Assuming the color component digital image 300 contains eight bits of information for each picture element, the color component digital image 300 may be divided into eight bit plane images including a most significant bit (MSB) plane image 310, a least significant bit (LSB) plane image 317, and six intermediate bit plane images 311, 312, 313, 314, 315, and 316. For example, the color component digital image 300 may be an array of 3000×4000 eight-bit bytes, each of which represents the optical transmission or reflection of a corresponding pixel. The most significant bit plane image 310 may be an array of 3000×4000 bits, each of which is equal to the most significant bit of the corresponding pixel in the color component digital image 300. Similarly, each of the other bit plane images 310, 311, 312, 313, 314, 315, and 316 may be an array of 3000×4000 bits, each of which is equal to the respective bit of the corresponding pixel in the color component digital image 300. A color component digital image may have more or fewer than 3000×4000 pixels, and more or fewer than 8 bits per pixel.

Figure 4:
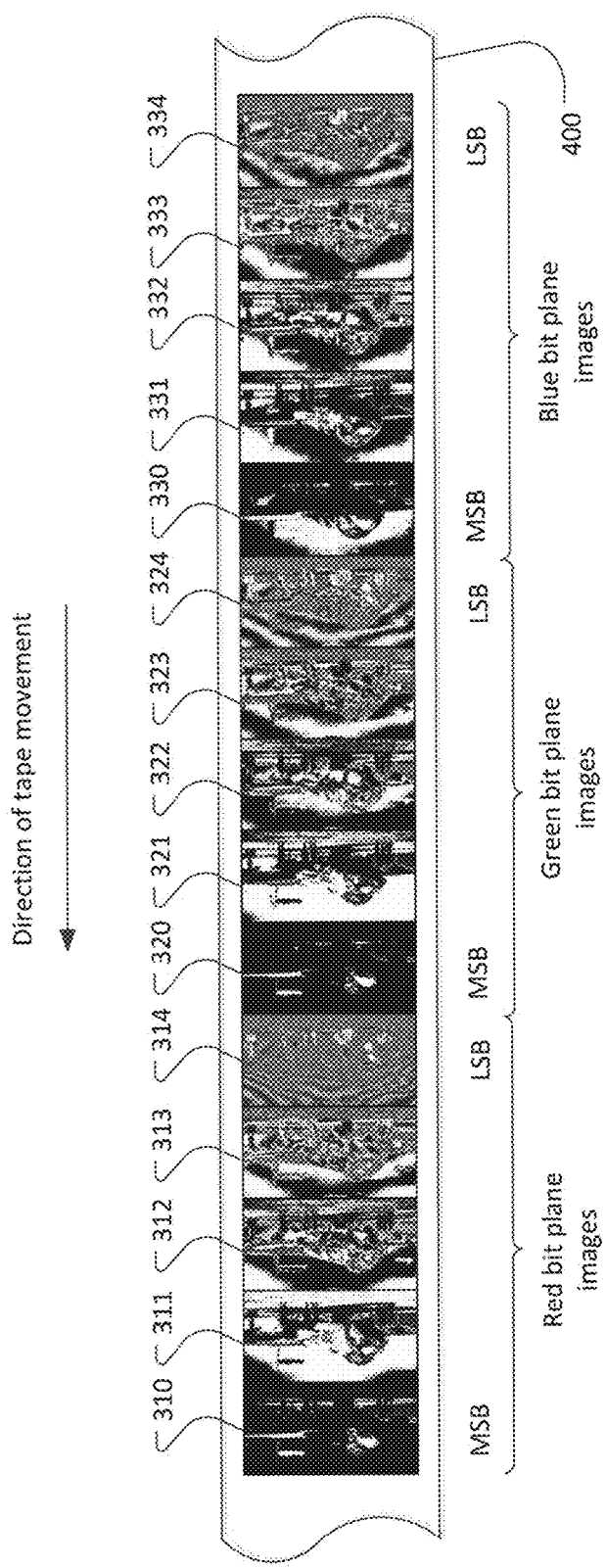
FIG. 4 is an example of the image of FIG. 2 archived on DOTS media.
Figure 5:
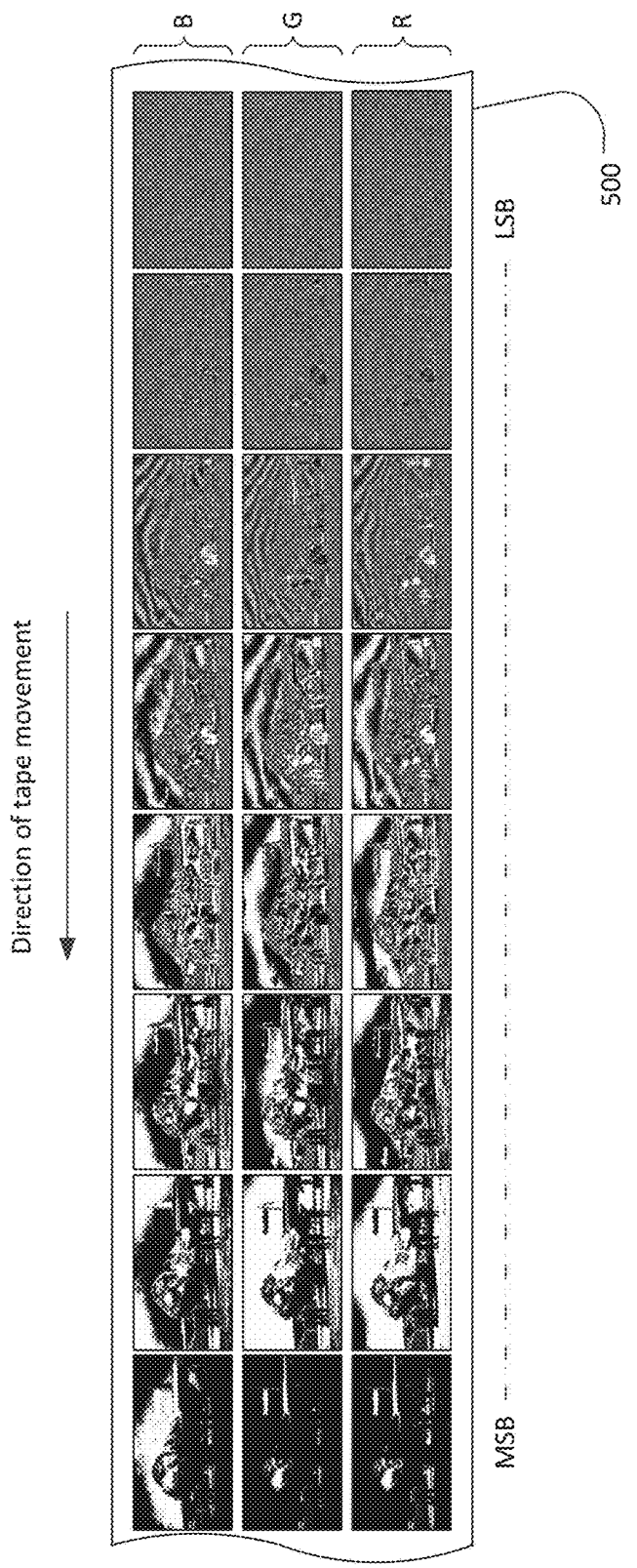
FIG. 5 another example of the image of FIG. 2 archived on DOTS media.

Referring again to FIG. 1, at 140 the individual bit plane images may be written onto the DOTS media. For example, as shown in FIG. 4, bit plane images for the three color component digital images may be written onto DOTS media 400 sequentially. In this example, a single color image is recorded in five bit plane images (310-314, 320-324, 330-334) for each primary color, starting with red most significant bit plane image 310 and ending with blue least significant bit plane image 334. Five bit plane images per color are shown in FIG. 4 for ease of illustration. A color image would typically be recorded in eight to twelve bit plane images per primary color. For further example, as shown in FIG. 5, bit plane images for the primary colors may be written onto DOTS media side-by-side. In this example, a single color image frame is recorded on DOTS media 500 as eight bit plane images per color, starting with the most significant bit plane images and finishing with the least significant bit plane images.

Figure 6:
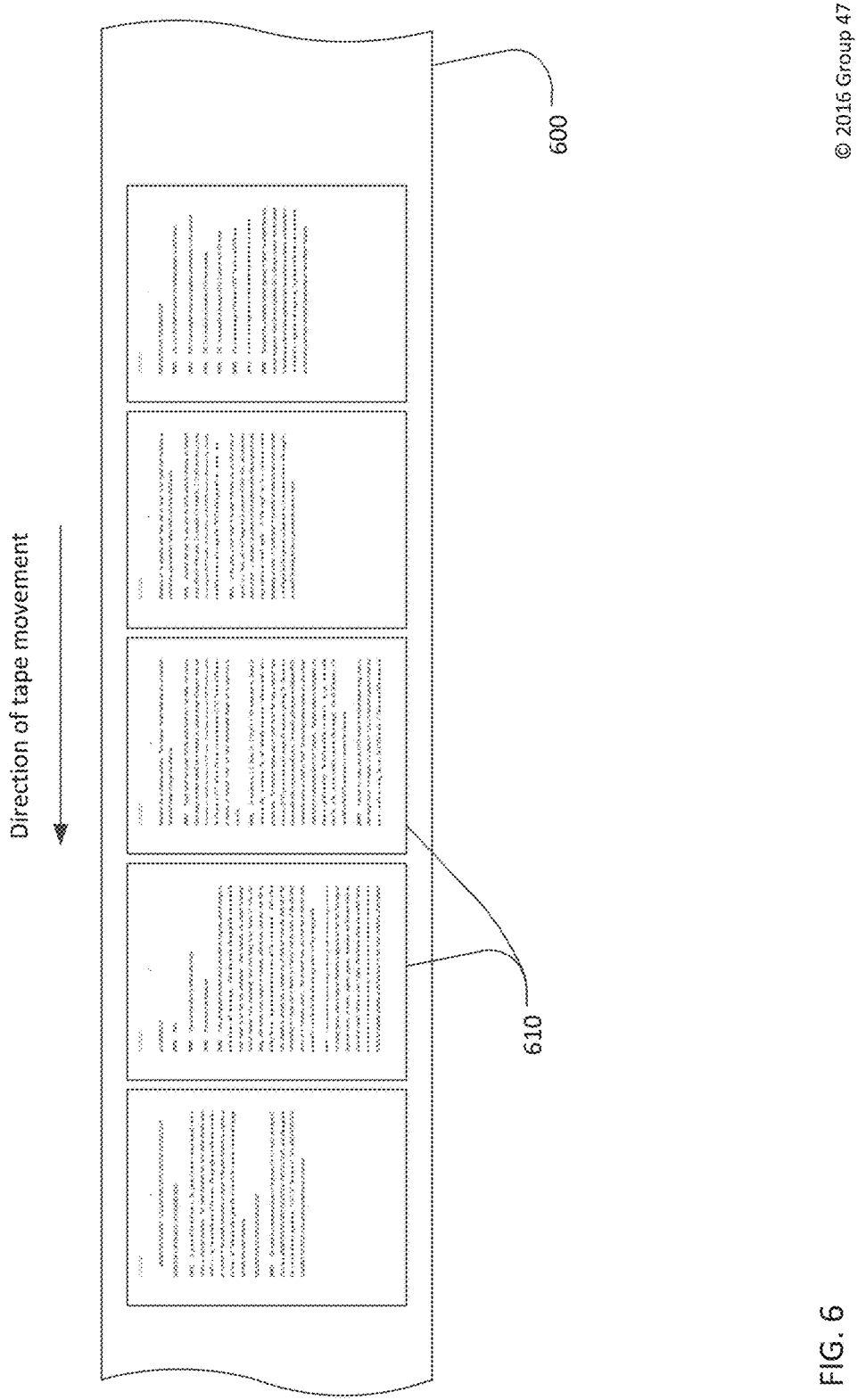
FIG. 6 is an example of a document archived on DOTS media.

The images written onto the DOTS media are not necessarily full-color or multiple-color images. Monochrome or one-color images may also be written. For example, images of black-and-white digital or paper documents may be written onto the DOTS media as shown in FIG. 6. In this case, only a single bit-plane image may be written for each document page.

As shown in FIG. 4, FIG. 5, and FIG. 6, the process 100 records images on the DOTS media as binary data. Recording the image as a sequence of bit plane images avoids the need for a digital image file format (such as JPEG, PNG, TIFF, etc.), which may become obsolete or be forgotten as the years pass. Further, recording the image as a sequence of bit plane images is robust to damage. That is, if a dot or several spots on a given bit plane image are damaged, only those pixels are affected when the image is reconstructed, and the effect of the damage is to simply change the hue of a single color. Defects that occur in a single bit plane image may be correctable by interpolation or other image processing.

The constituent bit plane images of a color image or a monochrome image may be recorded on DOTS media as shown in FIG. 4, FIG. 5, and FIG. 6, or in some other orientation and/or sequence. The orientation and sequence of the bit plane images may be selected in consideration of the resolution of the digitized image and the recording capacity of the DOTS media and the associated recording apparatus. The orientation and sequence of the bit plane images may be selected to make most efficient use of the recording capacity of the DOTS media.

Other information, not shown in FIG. 4, FIG. 5, and FIG. 6, may be written onto the DOTS media concurrently with writing the bit plane images. In this context, "concurrently" means "within the same time period." Other information may be written before, after, adjacent to, between, interleaved with, or embedded within the image bit plane images. For example metadata, such as a film title and related information, that globally defines the content of the DOTS media may be recorded before, after, or interleaved with the image bit plane images. Metadata, such as a sequence number, that defines each image frame may be recorded before, after, adjacent to, or between the constituent bit plane images of each image frame.

One or more fiducial markers that enable a read-out system to locate, identify, and read the image bit planes may also be recorded on the DOTS media concurrent with recording the image bit plane images. Each fiducial marker may be, for example, a graphical object or shape written beside or interleaved with the bit plane images for use as a point of reference for the read-out system.

Description of Apparatus

Figure 7:
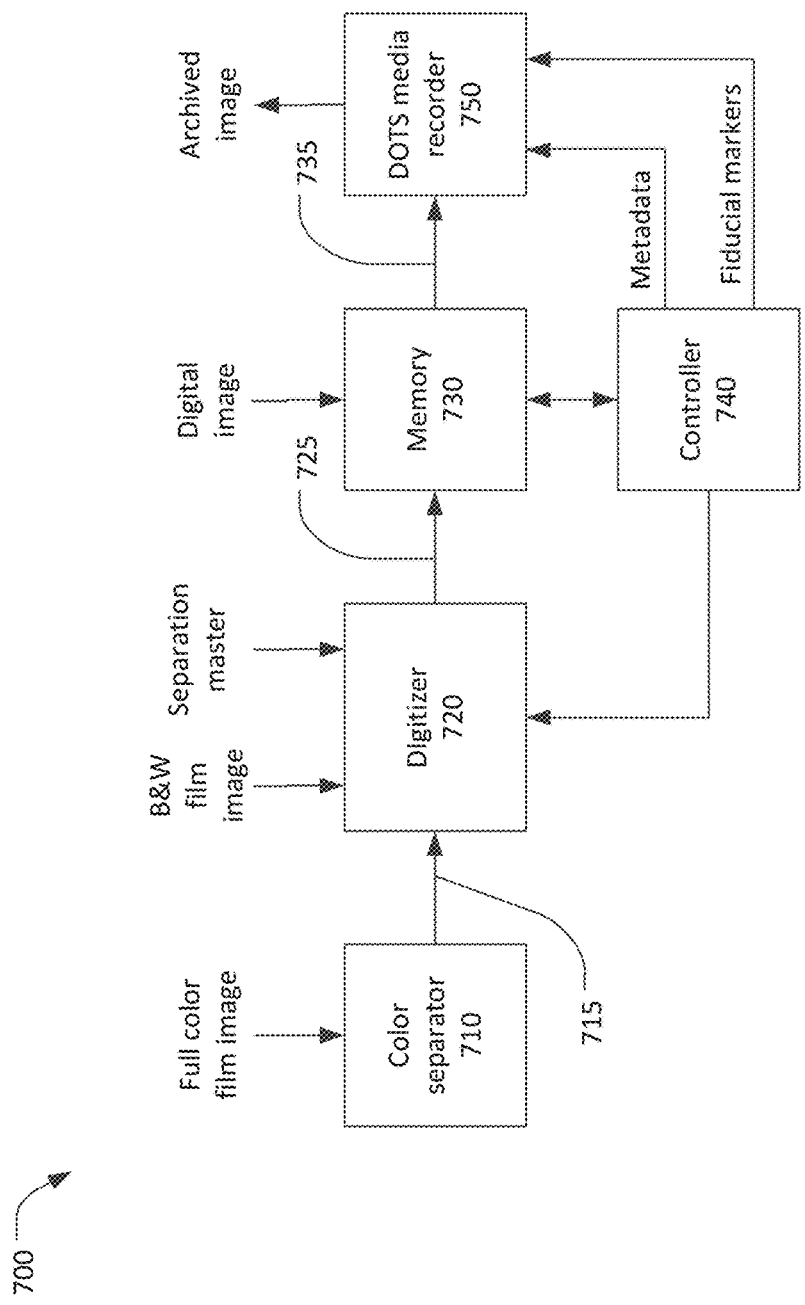
FIG. 7 is a block diagram of a system for archiving imagery on DOTS media.

Referring now to FIG. 7, an apparatus for archiving images may include a color separator 710, a digitizer 720, a memory 730, a controller 740, and a DOTS media recorder 750. The color separator 710 may not be needed in an apparatus for archiving black and white images and/or motion pictures already recorded as separation masters. The digitizer 720 may not be needed in an apparatus for archiving images captured with a digital camera or digital scanner, or images created utilizing digital imagery processes or software.

The color separator 710 may be configured to print the color image, or a negative of the color image, onto black and white film. The color separator 710 may be, for example, a photographic printer equipped with independent red, green, and blue light sources (or a white light source with selectable red, green, and blue filters). The color separator 710 may be three photographic printers equipped respectively with red, green, and blue light sources. The color separator 710 may be configured to print each full color image or full color image frame as three black and white images or image frames representing the red, green, and blue color components of the full color image. The output of the color separator 710 may be a separation master 715, as previously described.

The digitizer 720 may be configured to digitize a monochrome or black and white image or the three color component images of the separation master 715 to provide one or more color component digital images 725. The digitizer 720 may digitize each image by scanning each image or image frame past a linear or two-dimensional photodetector array, by scanning each image using a flying spot scanner, or by some other technique.

The one or more color component digital images 725 may be stored, at least temporarily, in a memory 730. Bit plane images 735 may be read from the memory 730 for writing onto DOTS media by a DOTS media recorder 750. The DOTS media recorder may be the printing system described in U.S. Pat. No. 7,248,278 or some other apparatus configured to write data onto the DOTS media.

A controller 740 may control and synchronize the operation of the digitizer 720, the memory 730 and the DOTS media recorder 750. The controller may control writing the one or more color component digital images 725 into the memory 730 and reading the bit plane images 735 from the memory. The controller 740 may also generate metadata and fiducial markers to be written onto DOTS media by the DOTS media recorder 750.

The controller 740 may include digital logic circuits, memories, processors, and other circuits configured to perform the functions described herein. All or portions of the functions of the controller 740 may be implemented in hardware. All or portions of functions of the controller 740 may be implemented by software executed by one or more processors, such as a microprocessor or a digital signal processor. All or portions of the controller may be implemented in one or more application specific integrated circuits and/or one or more programmable gate arrays.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element It is claimed:

1. A method for archival storage of a digital image comprising an array of picture elements, the method comprising:
converting the digital image into one or more bit plane images;
writing each of the plane images separately onto a digital optical tape, each bit plane image written as a single image frame having an array of pixels corresponding to the array of picture elements; and
writing fiducial markers onto the digital optical tape concurrent with writing the bit plane images onto the digital optical tape.

2. The method of claim 1, wherein writing each of the bit plane images separately onto the digital optical tape further comprises:
writing the bit plane images onto the digital optical tape sequentially.

3. The method of claim 1, wherein writing each of the bit plane images separately onto the digital optical tape further comprises:
writing multiple bit plane images side-by-side on the digital optical tape.

4. The method of claim 1, further comprising writing metadata onto the digital optical tape concurrent with writing the bit plane images.

5. The method of claim 1, wherein converting the digital image into one or more bit plane images further comprises:
converting a image into one or more color component digital images; and
converting each of the one or more color component digital images into one or more bit plane images.

6. An apparatus for archival storage of a digital image comprising an array of picture elements, the apparatus comprising:
an optical media recorder; and
a controller configured to:
convert the digital image into one or more bit plane images;
control the optical media recorder to write the bit plane images separately onto a digital optical tape, each bit plane image written as a single image frame having an array of pixels corresponding to the array of picture elements; and
control the optical media recorder to write fiducial markers onto the digital optical tape concurrent with writing the bit plane images onto the digital optical tape.

7. The apparatus of claim 6, wherein the controller is configured to control the optical media recorder to write the bit plane images onto the digital optical tape sequentially.

8. The apparatus of claim 6, wherein the controller is configured to control the optical media recorder to write multiple bit plane images side-by-side on the digital optical tape.

9. The apparatus of claim 6, wherein the controller is configured to control the optical media recorder to write metadata onto the digital optical tape concurrent with writing the bit plane images.

10. The method of claim 1, further comprising:
generating the fiducial markers.

11. The apparatus of claim 6, the controller further configured to:
generate the fiducial markers.

\* \* \* \* \*